United States Patent
Chou et al.

(10) Patent No.: US 9,078,140 B2
(45) Date of Patent: Jul. 7, 2015

(54) METHOD AND SYSTEM OF BEACON TRANSMISSION AND RECEPTION USING DIRECTIONAL ANTENNAS

(75) Inventors: Chun-Ting Chou, Taipei (TW); Richard Chen, Croton-On-Hudson, NY (US); Seyed-Alireza Seyedi-Esfahani, Fairport, NY (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 820 days.

(21) Appl. No.: 12/517,872

(22) PCT Filed: Dec. 12, 2007

(86) PCT No.: PCT/IB2007/055069
§ 371 (c)(1),
(2), (4) Date: Nov. 15, 2010

(87) PCT Pub. No.: WO2008/075264
PCT Pub. Date: Jun. 26, 2008

(65) Prior Publication Data
US 2011/0044224 A1 Feb. 24, 2011

Related U.S. Application Data

(60) Provisional application No. 60/870,418, filed on Dec. 18, 2006.

(51) Int. Cl.
*H04W 16/28* (2009.01)
*H04W 48/08* (2009.01)
*H04W 48/16* (2009.01)
*H04W 74/04* (2009.01)

(52) U.S. Cl.
CPC .............. *H04W 16/28* (2013.01); *H04W 48/08* (2013.01); *H04W 48/16* (2013.01); *H04W 74/04* (2013.01)

(58) Field of Classification Search
CPC ................. H04W 16/28; H04B 7/02–7/70404
USPC ......... 370/338, 339, 345, 346, 350, 491, 500; 455/507, 513, 63.4, 237.1
See application file for complete search history.

(56) References Cited

U.S. PATENT DOCUMENTS

| | | | | |
|---|---|---|---|---|
| 5,708,441 | A | * | 1/1998 | Kanai ........................... 342/359 |
| 2005/0221838 | A1 | * | 10/2005 | Cha et al. .................... 455/452.2 |

(Continued)

OTHER PUBLICATIONS

Guido R. Hiertz et al., "Mesh Networks Alliance (MNA) Proposal IEEE 802.11s—MAC Sublayer Functional Description IEEE 802.11s—Mesh WLAN Security", Internet citation, XP007901169 URL:http://www.ieee802.org/11/DocFiles/05/11-05-0605-02-000s-mesh-networks-alliance-proposal.doc.

*Primary Examiner* — Un C Cho
*Assistant Examiner* — Jeremy Costin
(74) *Attorney, Agent, or Firm* — Larry Liberchuk

(57) ABSTRACT

A system for broadcasting and receiving a beacon signal includes a beacon transmitter (310, 400) and a beacon receiver (320, 500). The beacon transmitter includes a beacon signal generator (410) to generate a beacon signal, and a directional antenna system (420) to selectively transmit the beacon signal in a corresponding one of M different directions during each one of M beacon slots (342) during a beacon period (340) in each of a plurality of superframes (330). The beacon receiver includes a beacon signal detector (510) to receive and detect the beacon signal, and a directional antenna system (520) having an antenna pattern including a main lobe and being adapted to selectively steer the main lobe in a selected one of N different directions during each of a plurality of receiver frames each having a time period substantially equal to a time period of one of the superframes.

21 Claims, 3 Drawing Sheets

(56) References Cited

U.S. PATENT DOCUMENTS

| | | | |
|---|---|---|---|
| 2006/0057964 A1* | 3/2006 | Roy et al. | 455/67.11 |
| 2006/0089141 A1* | 4/2006 | Ho et al. | 455/436 |
| 2006/0105771 A1 | 5/2006 | Iacono | |
| 2007/0133590 A1* | 6/2007 | Chun et al. | 370/443 |
| 2007/0165584 A1* | 7/2007 | Ponnampalam et al. | 370/338 |
| 2007/0268862 A1* | 11/2007 | Singh et al. | 370/329 |
| 2007/0287384 A1* | 12/2007 | Sadri et al. | 455/63.4 |
| 2009/0310573 A1* | 12/2009 | Sim et al. | 370/336 |

* cited by examiner

METHOD AND SYSTEM OF BEACON TRANSMISSION AND RECEPTION USING DIRECTIONAL ANTENNAS

This invention pertains to wireless communication devices and methods, and more particularly, to a method and system of beacon transmission and reception for wireless devices employing directional antennas.

In both centralized and distributed wireless networks, beacon signals are widely used to convey important control information between wireless devices. In particular, when a "new" wireless device is just turned on, or just moved into an area where one or more other wireless devices (e.g., a wireless access point) are already operating, the beacon signal includes important information that allows the "new" wireless device to establish communications with the other existing wireless device(s). Such information may include timing information for synchronizing communications between the wireless devices, operating channels or frequencies, time slot assignments for data transmission, etc.

Beacon signals are usually broadcast so that any wireless device in the transmission range of the beaconing device can receive the beacon. In the past, such beacon signals have been broadcast and received using omni-directional, or substantially omni-directional, antennas both at the beacon transmitter and at the beacon receiver. FIG. 1 illustrates an example of such an omni-directional beaconing arrangement, including a beaconing device 110 and two wireless beacon receiving devices 120.

However, in next-generation wireless networks, operating frequencies are in many cases much higher than in previous systems. For example, some of these systems operate at frequencies in the range of 60 GHz, or even higher. Unfortunately, signals that are broadcast or transmitted at these higher frequencies suffer substantially greater attenuation—particularly when passing through intervening objects such as walls in a building—compared to signals at lower operating frequencies. As a result, unless transmitter power levels are substantially increased (which is often not permissible), then communication ranges for wireless devices operating at these higher frequencies are substantially reduced.

One solution to mitigate the problems of these higher frequency bands is the use of directional antennas by the wireless devices. As is well known, when the beamwidth of a transmitting or broadcasting antenna pattern is reduced, an antenna gain is achieved which has an effect as if the transmitter power level has been increased. Similarly, when the beamwidth of a receiving antenna pattern is reduced, an antenna gain is achieved which has an effect as if the received power level has been increased. By employing directional antennas with sufficiently narrow beamwidths (i.e., sufficient antenna gains) for transmission and reception, wireless devices are able to operate at higher frequency bands while still maintaining an acceptable communication range.

However, when a wireless device broadcasting a beacon signal employs a directional antenna, the beacon signal is only broadcast in the direction of the antenna pattern. Therefore, only a small percentage of the wireless devices that might be in communication range for the beaconing device are able to actually receive the beacon signal. Furthermore, this problem is exacerbated when the receiving wireless devices also employ directional antennas whose beams may not be pointed at the beaconing device. Meanwhile, because presumably neither the beaconing device nor a "new" wireless device searching for the beacon signal are aware of each other, they have no way of knowing which way to point their antennas, or when to do so, such that the beacon signal may be effectively communicated from the beaconing device to the wireless device.

FIG. 2 illustrates an example of such an arrangement, including a beaconing device 210 and two wireless devices 220a and 220b searching for a beacon signal. Wireless device 220a has its directional antenna pointed at beaconing device 210, but it still cannot receive the beacon signal because beaconing device 210 has its directional antenna pointed away from wireless device 220a. Meanwhile, beaconing device 210 has its directional antenna pointed at wireless device 220b, but wireless device 220b cannot receive the beacon signal because its directional antenna is pointed away from beaconing device 210.

Accordingly, it would be desirable to provide a method of beacon transmission and reception for wireless devices employing directional antennas. It would further be desirable to provide a beacon transmitter that employs a directional antenna and yet is able to communicate beacon signals to wireless devices located in any direction with respect to it. It would be still further desirable to provide a wireless device with a directional antenna that is capable of receiving a beacon signal from a beaconing device located in any direction with respect to it.

In one aspect of the invention, a method of broadcasting a beacon signal comprises: providing a plurality of superframes each including a beacon period having at least M beacon slots; generating a beacon signal to be broadcast during the beacon period of each of the plurality of superframes; and broadcasting the beacon signal in a corresponding one of M different directions during each one of the M beacon slots during the beacon period, wherein the beacon signal is broadcast in all M directions during each beacon period.

In another aspect of the invention, a beacon transmitting device comprises: a beacon signal generator adapted to generate a beacon signal; and a directional antenna system adapted to broadcast the beacon signal in a corresponding one of M different directions during each one of M beacon slots during a beacon period in each of a plurality of superframes, wherein the directional antenna system broadcasts the beacon signal in all M directions during each beacon period.

In still another aspect of the invention, a beacon signal is received that is broadcast by a beaconing device in a selected one of M different directions during each one of M beacon slots during a beacon period in each of a plurality of superframes. The method comprises: (1) directing a main lobe of a directional antenna pattern in a first one of N directions during a receiver frame having a time period substantially equal to a time period of one of the superframes; (2) searching for a beacon signal during the receiver frame; (3) when the beacon signal is not detected during the receiver frame, directing the main lobe of the directional antenna pattern in a next one of N directions during a next receiver frame; and (4) repeating steps (2) and (3) until the beacon signal is detected.

In yet another aspect of the invention, a wireless device receives a beacon signal broadcast in a selected one of M different directions during each one of M beacon slots during a beacon period in each of a plurality of superframes. The wireless device comprises: a beacon signal detector adapted to receive and detect a beacon signal; and a directional antenna system coupled to an input of the beacon detector, the directional antenna system having an antenna pattern including a main lobe and being adapted to direct the main lobe in one of N different directions during each of a plurality of receiver frames each having a time period substantially equal to a time period of one of the superframes, wherein the directional antenna system steers the main lobe of the antenna pattern in all N directions during N consecutive receiver time periods FIG. 1 illustrates an arrangement for broadcasting and receiving a beacon signal using omni-directional antennas.

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided as teaching examples of the invention.

Figure 1:
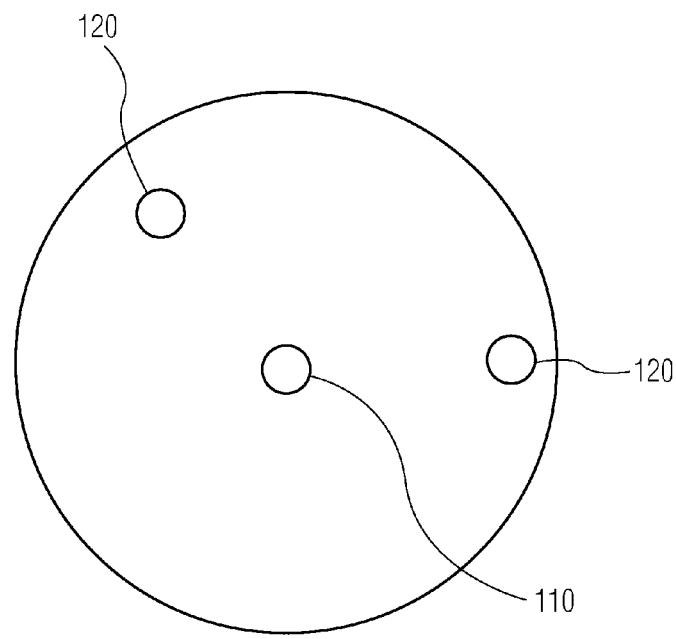
Figure 2:
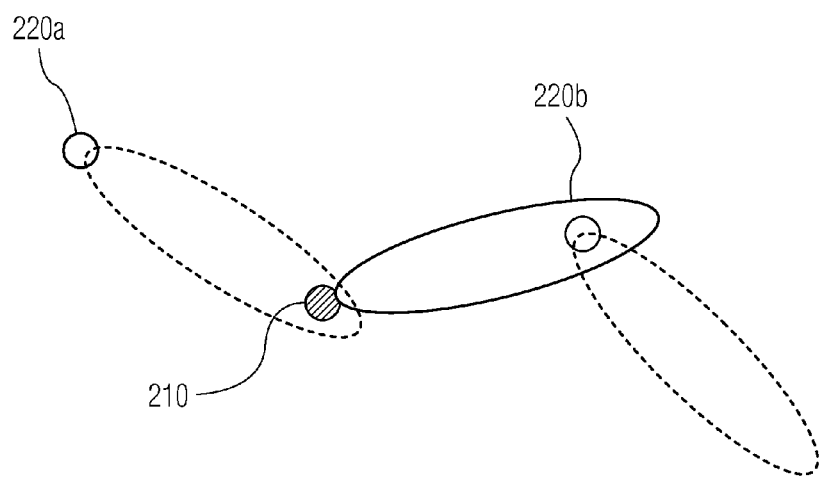
FIG. 2 illustrates problems in broadcasting and receiving a beacon signal using directional antennas.
Figure 3:
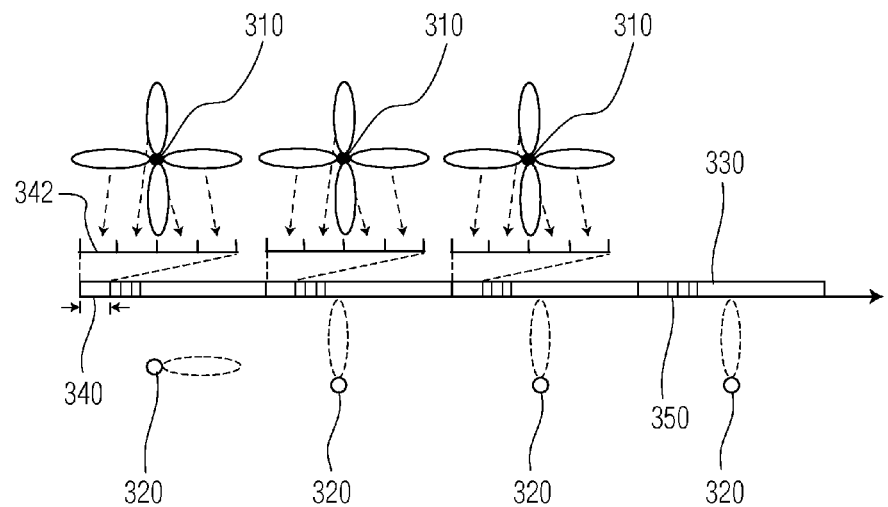
FIG. 3 illustrates one embodiment of an arrangement for broadcasting and receiving a beacon signal using directional antennas.

FIG. 3 illustrates one embodiment of an arrangement for broadcasting and receiving a beacon signal using directional antennas. FIG. 3 illustrates a wireless beacon transmitting device (beaconing device) 310 and a wireless beacon receiving device 320.

Beaconing device 310 includes a beacon signal generator generating a beacon signal, and a directional antenna system for transmitting the beacon signal. The directional antenna system of beaconing device 310 produces a directional antenna pattern having a main lobe, which is illustrated in FIG. 3. The directional antenna system of beaconing device 310 can steer or switch the main lobe in a plurality, M, of different directions. For simplifying the drawings and explanation, the example of FIG. 3 shows a case where M=4. However, it should be understood that M can be, and in general is, much greater than 4. In one exemplary embodiment, M=20. Beneficially, the number of directions, M, is large enough such that, taken together with the width of the main lobe, at least a portion of the main lobe can be steered over a range of at least 360 degrees.

As shown in FIG. 3, beaconing device 310 operates by transmitting in a plurality of superframes 330. Each superframe 330 includes a beacon period 340 comprising a plurality of beacon slots 342. Beneficially, the number of beacon slots 342 is equal to M, the number of directions in which the directional antenna of beaconing device 310 is adapted to be steered or switched.

Beneficially, in the exemplary embodiment of FIG. 3 each superframe 330 also includes a plurality of data slots 350 for transmitting a payload data. In one embodiment, the payload data may be video data, or a combination or audio data and video data, as explained in further detail below. Payload data may be transmitted during data slots 350 by beaconing device 310, and/or by other wireless devices in the vicinity.

Wireless device 320 includes a beacon signal detector, and a directional antenna system coupled to an input of the beacon detector. The directional antenna system of wireless device 320 produces a directional antenna pattern having a main lobe. The directional antenna system of wireless device 320 can steer or switch the main lobe in a plurality, N, of different directions. For simplifying the drawings and explanation, the example of FIG. 3 shows a case where N=4. However, it should be understood that N can be, and in general is, much greater than 4. In one exemplary embodiment, N=20. Beneficially, the number of directions, N, is large enough such that, taken together with the width of the main lobe, at least a portion of the main lobe can be steered over a range of at least 360 degrees. Although for simplification in the example of FIG. 3 the number, N, of directions of the directional antenna system of wireless device 320 is the same as the number, M, of directions of the directional antenna system of beaconing device 310, it should be understood that in general, N does not have to be the same as M.

Operationally, the arrangement of FIG. 3 functions as follows.

To establish communications between wireless device 320 and beaconing device 310 (and/or other wireless device(s)), a beacon signal must first be successfully communicated to wireless device 320. The beacon signal includes important information that allows the "new" wireless device 320 to establish communications with beaconing device 310 and/or other existing wireless device(s). Such information may include timing information for synchronizing communications between the wireless devices, operating channels or frequencies, time slot assignments for data transmission, etc.

Initially it is assumed that beaconing device 310 has established timing based on superframes 330, and is transmitting a beacon signal during a beacon period 340 in each superframe 330, as described in greater detail below. Subsequently, a wireless device 320 is either turned on, moves into an area where beaconing device 310 is already operating, or perhaps loses synchronization with beaconing device 310 (e.g., fails to receive a beacon for a predetermined length of time). Accordingly, no apriori location/direction information is available to beaconing device 310 and wireless device 320 with respect to each other. Furthermore, it is assumed that wireless device 320 is not synchronized to beaconing device 310. However, it is assumed that wireless device 320 does have apriori knowledge of the approximate length of time of superframe 330. Therefore, wireless device 320 establishes a series of "receiver frames" each having a length substantially equal to the length of one superframe 330. As used herein, the term "receiver frame" does not necessarily refer to any specific communication frame having slots, etc. but simply refers to a repeating set of time frames, or time periods, established by the receiver that are each of essentially the same length in time as a superframe 330 that would be broadcast by a beaconing device 310, but which may not be synchronized to any superframe 330

Beaconing device 310 broadcasts the beacon signal in a corresponding one of M different directions during each one of the M beacon slots 342 during the beacon period 340 of each superframe 330. In this way, the beacon signal is broadcast in all M directions during each beacon period 340 in each superframe 330. Of course beaconing device 310 may use more than M beacon slots 342 for transmitting the beacon signal in the M directions, which may provide some redundancy or other advantages, at the expense of efficiency. Also, although as shown in FIG. 3 the beacon period 340 is one continuous time period comprising the M beacon slots 342 at the start of superframe 330, it should be understood that beacon period 340 could comprise any continuous or non-continuous time period(s) anywhere in superframe 330 in which beacon slots 342 are provided for broadcasting the beacon signal.

Meanwhile, the directional antenna system of wireless device 320 directs its main lobe of its antenna pattern in a first one of N directions (e.g., direction J) during a first receiver frame, and searches for a beacon signal during the receiver frame. If the beacon signal is received, then wireless device 320 can synchronize and establish communications with beaconing device 310. Furthermore, wireless device 320 also now knows that it should always steer or switch its directional antenna system to the direction J towards beaconing device 310 to receive the beacon, until and unless a predetermined period of time elapses where the beacon signal has been lost and reacquisition becomes necessary.

On the other hand if wireless device 320 does not receive the beacon signal during the first receiver frame, then its directional antenna system directs the main lobe of its directional antenna pattern to a next one of N directions (e.g., direction J+1) during a next receiver frame, and again searches for a beacon signal during the next receiver frame.

This process is repeated for all N directions, or until a beacon signal is detected. In this way, the directional antenna system of wireless device 320 steers the main lobe of the antenna pattern in all N directions during N consecutive receiver frames (a time period essentially equal to N consecutive superframes), or until it detects a beacon signal—which ends the beacon search process.

In the example shown in FIG. 3, wireless device 320 receives the beacon signal during the third beacon slot 342 in the second superframe 330.

It should be understood that according to the arrangement described above, the maximum time that it takes for wireless device 320 to receive a beacon signal from beaconing device 310 depends only on the length of superframes 330 and the number, N, of different directions in which the directional antenna system of wireless device 320 directs its main lobe. That is, because beaconing device 310 transmits in all directions during the beacon period 340 of each superframe 330, then so long as it points its antenna pattern at beaconing device 310 during a full superframe 330, wireless device 320 is assured of receiving the beacon signal, even if its timing is not synchronized to beaconing device 310. Since the directional antenna system of wireless device 320 has N different possible directions, it is assured of receiving the beacon signal within N superframes 330.

Figure 4:
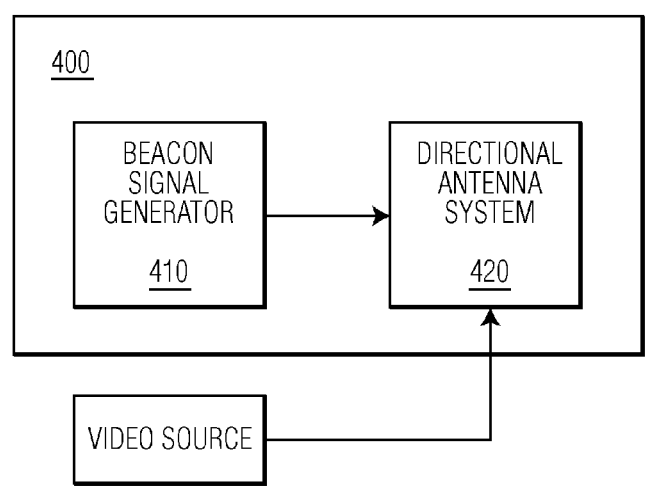
FIG. 4 is a functional block diagram of one embodiment of a beaconing device having a directional antenna system that can broadcast a beacon signal in the arrangement of FIG. 3

FIG. 4 is a functional block diagram of one embodiment of a beaconing device 400 having a directional antenna system that can broadcast a beacon signal in the arrangement of FIG. 3. In one embodiment, beaconing device 400 is an IEEE 802.11 access point. Beaconing device 400 may be a standalone wireless device, or may be connected to or integrated with another device. In the embodiment shown in FIG. 4, beaconing device 400 transmits audio/video payload data, in addition to the beacon signal, and is connected to an audio/video source, such as a broadcast television receiver, cable receiver, satellite receiver, video tape player, or video disc (e.g., DVD) player that supplies a video signal to beaconing device 400. Of course beaconing device 400 may be incorporate in a same physical unit as the video source.

Beaconing device 400 includes beacon signal generator 410 and directional antenna system 420.

Beacon signal generator 410 generates a beacon signal for periodic broadcast by beaconing device 400. In one embodiment, beacon signal generator 410 generates the beacon signal for transmission in a plurality, M, of different directions during a corresponding number, M, of beacon slots in a beacon period in a periodically-transmitted superframe. Of course beacon signal generator 410 may use more than M beacon slots for transmitting the beacon signal in the M directions, which may provide some redundancy or other advantages, at the expense of efficiency.

Beacon signal generator 410 may include a combination of hardware, software, and/or firmware elements, such as a clock, a processor/controller, memory, a data formatter, a signal modulator, an RF or microwave transmitter, etc. In one embodiment, beacon signal generator 410 may integrate the beacon signal into a superframe with payload data to be communicated to various wireless devices in specified time slots within the superframe.

Directional antenna system 420 receives a signal to be transmitted, including the beacon signal (e.g., as a series of superframes 330), from beacon signal generator 410 and radiates the signal in a selected one of M available directions at a time, according to an antenna pattern provided by directional antenna system 420. Beneficially, the antenna pattern has a main lobe where most of the radiated energy is concentrated. The main lobe is said to have a beamwidth defined by the points at which the radiated energy is 3 dB below the maximum radiated energy at the "center" of the main lobe. Directional antenna system 420 is able to switch or steer the main lobe in any one of M directions, which beneficially span at least a range of 360 degrees. For example, in one embodiment, the main lobe beamwidth is about 20 degrees, and M is 20, such that directional antennas system 420 is able to point the main lobe in all possible directions by sequentially selecting all of the M available directions.

Directional antenna system 420 can be realized in a variety of embodiments, including a phased array antenna, or a plurality of individual directional antenna elements which can be selectively switched on and off, where each of the plurality of antenna elements provides a corresponding main lobe having a central direction different from the other antenna elements.

Directional antenna system 420 may further include a controller for controlling the steering or switching of the antenna pattern, or it may receive one or more signals from a processor/controller of beacon signal generator 410. In any event, directional antenna system 420 is controlled to transmit the beacon signal in a corresponding one of the M different directions during each one of the M beacon slots during the beacon period. As a result, the beacon signal is broadcast in all M directions during each beacon period, and therefore in each superframe.

Figure 5:
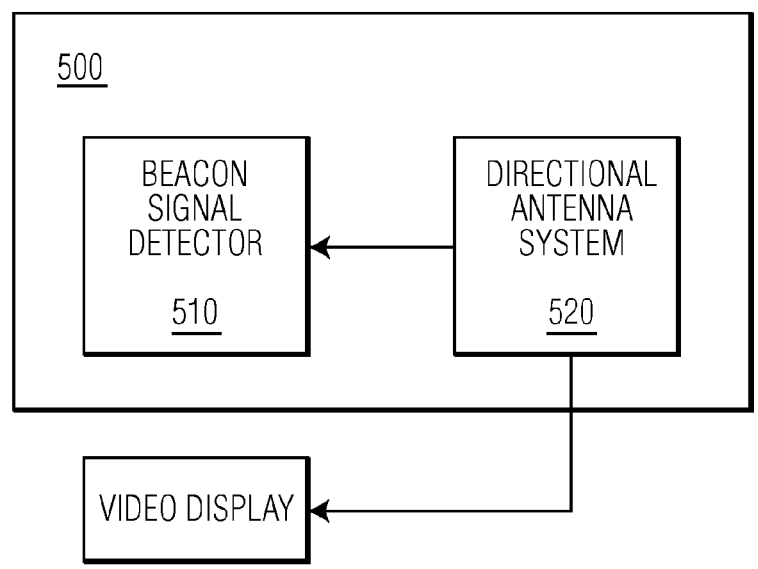
FIG. 5 is a functional block diagram of one embodiment of a wireless device having a directional antenna system that can receive a beacon signal in the arrangement of FIG. 3.

FIG. 5 is a functional block diagram of one embodiment of a wireless device 500 having a directional antenna system that can receive a beacon signal in the arrangement of FIG. 3. In the embodiment shown in FIG. 5, wireless device 500 receives audio/video payload data, in addition to the beacon signal, and is connected to an audio/video display device, such as video display, a computer display, a handheld display, or other device that receives a video signal from wireless device 500.

Wireless device 500 includes beacon signal detector 510 and directional antenna system 520.

Beacon signal detector 510 searches for and detects a beacon signal broadcast by a beaconing device. In one embodiment, beacon signal detector 510 searches for the beacon signal in a plurality, N, of different directions during a corresponding number, N, of receiver frames that are each approximately the same length as a superframe.

Beacon signal detector 510 may include a combination of hardware, software, and/or firmware elements, such as a clock, a processor/controller, memory, an RF or microwave receiver, a signal demodulator, a data detector, etc. In one embodiment, beacon signal detector 510 may use some or all of the same elements to detect payload data communicated from a beaconing device (or other wireless device) in specified time slots within the superframe, thus comprising a data receiver.

Directional antenna system 520 receives a transmitted signal, including the beacon signal (e.g., as a series of superframes 330), from a beaconing device in a selected one of N available directions at a time, according to an antenna pattern provided by directional antenna system 520. Beneficially, the antenna pattern has a main lobe where most of the radiated energy is concentrated. Directional antenna system 520 is able to switch or steer the main lobe in any one of N directions, which beneficially span at least a range of 360 degrees. For example, in one embodiment, the main lobe beamwidth is about 20 degrees, and N is 20, such that directional antenna system 520 is able to point the main lobe in all possible directions by sequentially selecting all of the N available directions.

Directional antenna system 520 can be realized in a variety of embodiments, including a phased array antenna, or a plurality of individual directional antenna elements which can be selectively switched on and off, where each of the plurality of antenna elements provides a corresponding main lobe having a central direction different from the other antenna elements.

Directional antenna system 520 may further include a controller for controlling the steering or switching of the antenna pattern, or it may receive one or more signals from a processor/controller of beacon signal detector 510. In any event, directional antenna system 520 is controlled to point or direct its main lobe in a corresponding one of the N different directions during each one of the N consecutive receiver frames until beacon signal detector 510 detects a beacon signal. As a result, wireless device 500 is able to search in all N directions during a period of N consecutive receiver frames—which for all intents and purposes is the same length of time as N consecutive superframes.

While preferred embodiments are disclosed herein, many variations are possible which remain within the concept and scope of the invention. Such variations would become clear to one of ordinary skill in the art after inspection of the specification, drawings and claims herein. The invention therefore is not to be restricted except within the spirit and scope of the appended claims.

What is claimed is:

1. A method comprising:
   generating a beacon signal to be broadcast during a beacon period of each of a plurality of superframes, wherein the beacon period has at least M beacon slots where M is an integer greater than 1 and each superframe lasts a time period an approximation of which is part of a priori knowledge possessed by devices for which the beacon signal is intended to be received; and
   broadcasting the beacon signal in a corresponding one of M different directions during each of the M beacon slots during the beacon period in each superframe of the plurality of superframes, wherein the beacon signal is broadcast in all M different directions during each beacon period;
   wherein each of the plurality of superframes further includes a plurality of data slots for communicating payload data between a beaconing device that broadcasts the beacon signal and a beacon receiving device.

2. The method of claim 1, wherein the beacon signal includes beacon data for allowing the beacon receiving device to synchronize receiver frames with the superframes for payload data communication, wherein the receiver frames are defined in the beacon receiving device.

3. The method of claim 1, wherein the payload data includes video data.

4. The method of claim 1, wherein broadcasting the beacon signal in a corresponding one of M different directions comprises directing a main lobe of a directional antenna pattern in the corresponding direction, and wherein the number of directions M is such that at least a portion of the main lobe is steered over a range of at least 360 degrees during each beacon period.

5. The method of claim 4, wherein directing the main lobe of the directional antenna pattern in the corresponding one of M different directions comprises steering a phased array antenna.

6. The method of claim 4, wherein steering the main lobe of the directional antenna pattern in the corresponding one of M different directions comprises selecting one or more of a plurality of antenna elements, where each of the plurality of antenna elements provides a corresponding main lobe having a central direction different from the other antenna elements.

7. A beacon transmitting device, comprising:
   a beacon signal generator adapted to generate a beacon signal to be broadcast during a beacon period of each of a plurality of superframes, wherein the beacon period has at least M beacon slots where M is an integer greater than 1 and each superframe lasts a time period an approximation of which is part of a priori knowledge possessed by devices for which the beacon signal is intended to be received; and
   a directional antenna system adapted to broadcast the beacon signal in a corresponding one of M different directions during each one of the M beacon slots during the beacon period in each superframe of the plurality of superframes, wherein the directional antenna system broadcasts the beacon signal in all M different directions during each beacon period,
   wherein each of the plurality of superframes further includes a plurality of data slots for communicating payload data between the beacon transmitting device and a beacon receiving device.

8. The beacon transmitting device of claim 7, wherein the directional antenna system comprises a phased array antenna.

9. The beacon transmitting device of claim 7, wherein the directional antenna system comprises a plurality of antenna elements, where each of the plurality of antenna elements provides a corresponding main lobe having a central direction different from the other antenna elements.

10. The beacon transmitting device of claim 7, wherein the directional antenna system is adapted to direct a main lobe of a directional antenna pattern in a selected direction, and wherein the number of directions M is such that at least a portion of the main lobe is steered over a range of at least 360 degrees during each beacon period.

11. The beacon transmitting device of claim 7, wherein the beacon signal includes beacon data for allowing the beacon receiving device to synchronize receiver frames with the superframes for payload data communication, wherein the receiver frames are defined in the beacon receiving device.

12. The beacon transmitting device of claim 7, wherein the payload data includes video data, wherein the beacon transmitting device is connected to at least one of a broadcast television receiver, a cable television receiver, a satellite television receiver, a video tape player, and a video disk player for receiving the video data.

13. A method of receiving a beacon signal broadcast by a beaconing device in a selected one of M different directions during each one of M beacon slots during a beacon period in each of a plurality of superframes, wherein M is an integer greater than 1, wherein each superframe of the plurality of superframes further includes a plurality of data slots for communicating payload data from the beaconing device following the beacon period, the method comprising:
   (1) directing a main lobe of a directional antenna pattern in a first one of N directions during a receiver frame having a time period based on a priori knowledge on an approximation of a time period of a superframe of the plurality of superframes, wherein N is an integer greater than 1;

(2) searching for the beacon signal during the receiver frame;

(3) when the beacon signal is not detected during the receiver frame, directing the main lobe of the directional antenna pattern in a next one of the N directions during a next receiver frame;

(4) repeating steps (2) and (3) until the beacon signal is detected; and (5) recovering the payload data from each superframe while maintaining the main lobe in a direction in which the main lobe was directed when the beacon signal was detected.

14. The method of claim 13, wherein directing the main lobe of the directional antenna pattern in the first one of N directions, comprises steering a phased array antenna.

15. The method of claim 13, wherein directing the main lobe of the directional antenna pattern in the first one of N directions, comprises selecting one or more of a plurality of antenna elements, where each of the plurality of antenna elements provides a corresponding main lobe having a central direction different from the other antenna elements.

16. The method of claim 13, wherein the number of directions N is such that at least a portion of the main lobe is steered over a range of at least 360 degrees during N receiver frames.

17. A wireless device for receiving a beacon signal broadcast in a selected one of M different directions during each one of M beacon slots during a beacon period in each of a plurality of superframes, wherein M is an integer greater than 1, and wherein each superframe of the plurality of superframes further includes a plurality of data slots for payload data following the beacon period, the wireless device comprising:

a beacon signal detector adapted to receive and detect the beacon signal; and a directional antenna system coupled to an input of the beacon signal detector, the directional antenna system having an antenna pattern including a main lobe, the directional antenna system being adapted to direct the main lobe in one of N different directions during each of a plurality of receiver frames, wherein each receiver frame has a time period based on a priori knowledge, possessed by the wireless device, of an approximation of a time period of one superframe of the plurality of superframes, wherein the directional antenna system is further adapted to steer the main lobe of the antenna pattern in all N directions during N consecutive receiver frames until the beacon signal is detected by the beacon signal detector, wherein N is an integer greater than 1, and wherein the directional antenna system is further adapted to maintain the main lobe in a direction to which the main lobe was directed when the beacon signal detector detected the beacon signal; and wherein the wireless device further comprises a data receiver adapted to recover the payload data from each superframe while maintaining the main lobe in the direction in which the main lobe was directed at the time when the beacon signal detector detected the beacon signal.

18. The wireless device of claim 17, wherein the directional antenna system comprises a phased array antenna.

19. The wireless device of claim 17, wherein the directional antenna system comprises a plurality of antenna elements, where each of the plurality of antenna elements provides a corresponding main lobe having a central direction different from the other antenna elements.

20. The wireless device of claim 17, wherein the number of directions N is such that at least a portion of the main lobe is steered over a range of at least 360 degrees during each beacon period.

21. The wireless device of claim 17, wherein the payload data includes video data, the wireless device is connected to a video display for displaying the video data.

* * * * *